(No Model.)

J. W. THOMAS.
GATE.

No. 549,549.  Patented Nov. 12, 1895.

WITNESSES:
G. P. Bolser
A. Heywood

INVENTOR
John W. Thomas
BY
ATTORNEY.

UNITED STATES PATENT OFFICE.

JOHN W. THOMAS, OF NORTH BEND, NEBRASKA.

GATE.

SPECIFICATION forming part of Letters Patent No. 549,549, dated November 12, 1895.

Application filed January 24, 1895. Serial No. 536,110. (No model.)

*To all whom it may concern:*

Be it known that I, JOHN W. THOMAS, residing at North Bend, in the county of Dodge and State of Nebraska, have invented certain useful Improvements in Gates; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in gates, the object being to provide an ordinary gate adapted and arranged to be opened by an operator while seated in a vehicle.

Figure 1:
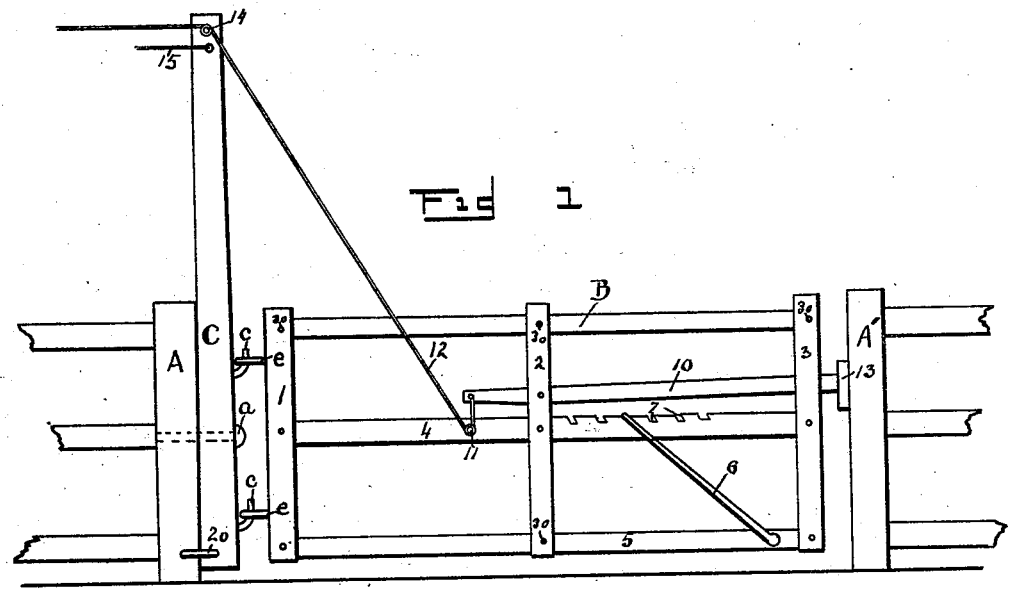
Figure 2:
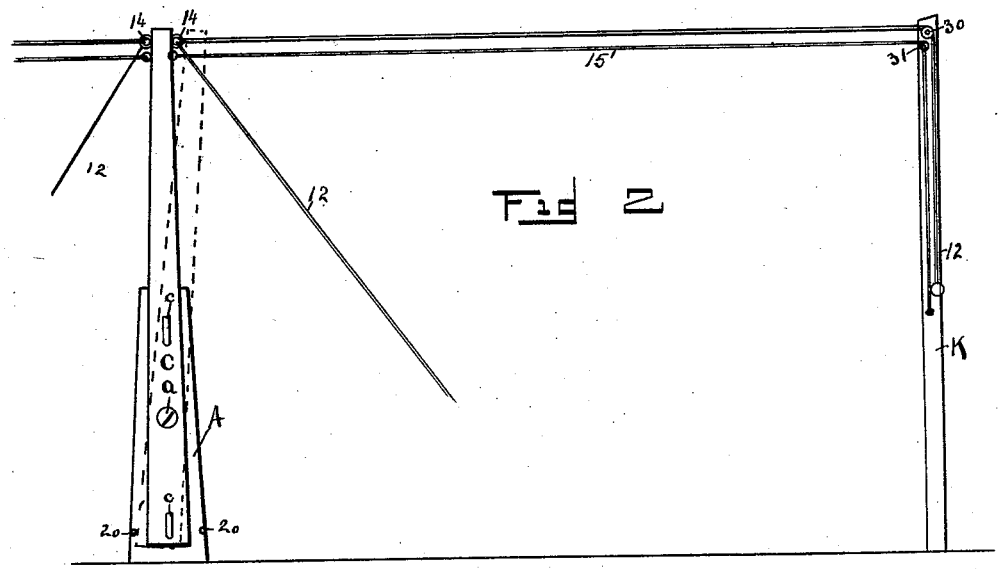

In the accompanying drawings, Figure 1 shows a front view of a gate embodying my invention, while Fig. 2 shows a detail view of the tilting auxiliary gate-post.

A A' represent two ordinary gate-posts, between which is secured an ordinary gate. To the post A is secured an upwardly-extending auxiliary gate-post C, secured to the post A by means of the bolt $a$, pivotally supporting this post C. The post A is further provided below with the two outwardly-projecting stop-bars 20 20, which limit the movement of the post C, as is shown in Fig. 2. This post C is further provided with two ears $c\ c$, adapted to receive the eyes $e$, forming part of the gate. The gate proper comprises the bar B, the intermediate bar 4, the lower bar 5, and the vertical bars 1, 2, and 3. All these bars are secured, preferably, simply by a bolt to pivotally secure these several bars. The several bars are secured by means of the bolt 30. To prevent these bars from sagging, I provide the lower rail 5 with the pivoted bar 6, which bar is adapted to lock within the notches 7 of the central bar, so that the forward vertical bar 3 can be raised or lowered according to the adjustment of this bar 6, which strides the bar 4. Pivotally secured to the central bar 2 is a gravity-actuated lever 10, working within an ordinary hasp 13. Extending from the rear end of this bar 10 is an actuating-cord 12, passing over a pulley 11, secured to the bar 4. This cord is further extended upward and passes through a ring 14, from which it extends at right angles to the position of the gate when closed and is secured to a suitable post K, passing over a pulley 30. This post K is a suitable distance from the gate proper, so that the operator could readily grasp the cord 12 from the seat of a vehicle.

The operation in opening the gate would be as follows: The gate being closed, the operator would draw the cord 12 down to actuate the pivoted bar 10, releasing said bar from the hasp, while at the same time the pivoted bar C would be tilted toward the operator. This tilting movement of the auxiliary post would carry the gate out of the perpendicular and fully open the same, permitting the operator and the accompanying team to pass through the same. Upon the opposite side a second and similar cord 12 would be grasped to bring the gate in a closed position, the bar 10 readily falling into the hasp to lock the gate.

If desired, an auxiliary cord 15 can be secured to the upper end of the pivoted auxiliary post C and carried to the post K, passing over a supporting-rail 31 upon said post. When this cord 15 is employed, the pivoted post C can first be tilted by means of this cord and the latch opened by means of the cord 12.

Now, having thus described my said invention, what I claim as new, and desire to secure by United States Letters Patent, is—

The combination of a hinged gate provided with a latch, a pivoted, auxiliary gate post extending above the gate and an operating cord running from said latch to the top of said pivoted, auxiliary post and passing to a suitable support, all substantially as and for the purpose set forth.

In testimony whereof I affix my signature in presence of two witnesses.

JOHN W. THOMAS.

Witnesses:
J. W. McCREATH,
CHAS. N. CROPPER.